United States Patent [19]

Smith

[11] Patent Number: 4,575,162

[45] Date of Patent: * Mar. 11, 1986

[54] SEALED BALL AND SOCKET JOINTS CAPABLE OF DISASSEMBLY

[75] Inventor: Joseph E. Smith, Birmingham, Mich.

[73] Assignee: O & S Manufacturing Co., Whitmore Lake, Mich.

[*] Notice: The portion of the term of this patent subsequent to Jun. 7, 2000 has been disclaimed.

[21] Appl. No.: 583,965

[22] Filed: Feb. 27, 1984

Related U.S. Application Data

[60] Division of Ser. No. 332,110, Dec. 18, 1981, Pat. No. 4,483,569, which is a continuation-in-part of Ser. No. 286,470, Jul. 24, 1981, Pat. No. 4,386,869.

[51] Int. Cl.⁴ .............................................. F16C 32/00
[52] U.S. Cl. ..................................... 308/2 R; 403/36
[58] Field of Search ............... 308/2 R, 236; 384/206, 384/208; 403/39, 36, 135, 38, 140

[56] References Cited

U.S. PATENT DOCUMENTS

| | | | |
|---|---|---|---|
| 3,350,122 | 10/1967 | Ulderup | 403/135 |
| 3,361,458 | 1/1968 | Herbenar | 403/38 |
| 4,003,666 | 1/1977 | Gaines | 403/36 |
| 4,034,996 | 7/1977 | Manita et al. | 403/140 |
| 4,138,168 | 2/1979 | Herlitzek | 308/236 |
| 4,386,869 | 6/1983 | Smith | 403/39 |

Primary Examiner—Lenard A. Footland
Attorney, Agent, or Firm—Hauke and Patalidis

[57] ABSTRACT

Sealed ball and socket joints having a spherical member capable of swiveling relative to a socket member. A bearing ring disposed with or without clearance in a housing has a concave spherical surface portion in swiveling engagement with the ball member, and a pair of symmetrically disposed resilient rings installed between the bearing ring and the inner surface of the housing constantly urge the bearing surface of the bearing ring in engagement with the spherical member surface to prevent rattle and to compensate for wear. A bellows seal, formed integrally with one of the resilient rings or, alternatively, formed separate, is fastened at one end in the shell. The bellows seal is held elastically at its other end around a portion of the spherical member. A second seal, disposed in the same manner, seals the gap between the shell and the spherical member in some structures, or the other end of the housing is closed by a separate end cap in other structures wherein the spherical member is a ball formed on the end of a stud. The bearings are prepacked with a lubricant, and the elements, including the resilient rings, are held in assembly by at least one spring snap ring retainer permitting disassembly for repacking with lubricant or for repairing the joints.

3 Claims, 6 Drawing Figures

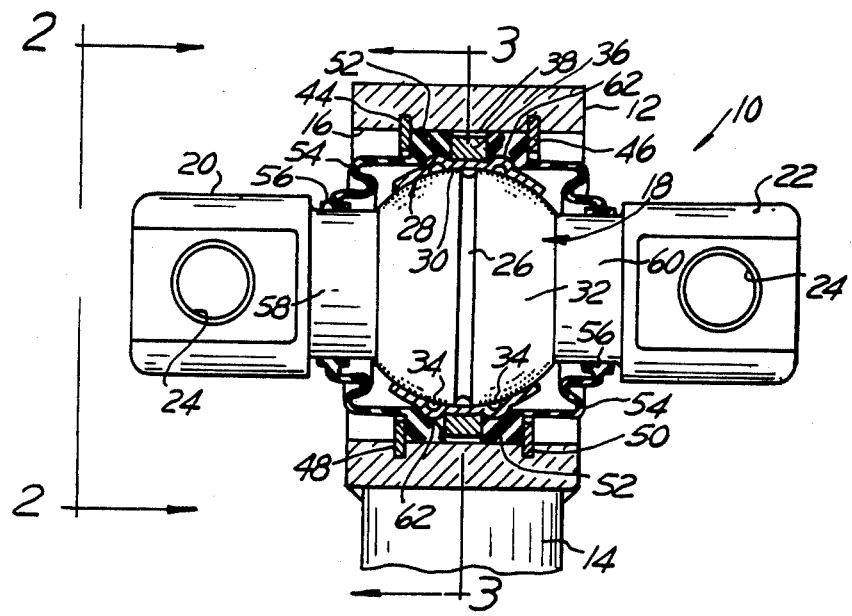

4,575,162

SEALED BALL AND SOCKET JOINTS CAPABLE OF DISASSEMBLY

The present application is a division of application Ser. No. 332,110, filed Dec. 18, 1981, now U.S. Pat. No. 4,483,569, which in turn is a continuation-in-part of application Ser. No. 286,470, filed July 24, 1981, now U.S. Pat. No. 4,386,869, all assigned to the same assignee as the present application.

BACKGROUND OF THE INVENTION

The present invention relates to sealed bearings in general, and more particularly to hermetically sealed knuckle or swivel joints of the ball and socket type.

Knuckle or swivel joints of the ball and socket type are of general use in motor vehicle steering tie rod assemblies, in drag links, torque rods, suspension stabilizers, shock absorbers and friction snubbers, for example. In heavy trucks, in military vehicles, in off-highway vehicles and in railroad vehicles, knuckle or swivel joints are required to accomplish their function under adverse ambient conditions with a long service life, with a minimum of maintenance or replacement, and they are often subjected to intense vibrations and excessive load forces in all directions.

The invention disclosed in U.S. Pat. No. 4,386,869 provides ball and socket joints in the form of integrally sealed units lubricated for life that are particularly well adapted to applications under demanding conditions, which are vibration and shock arsorbing or, in the alternative, which have solid non-resilient but non-rattling high load carrying capability and compensation for wear, are easy to manufacture and which accept wide manufacturing tolerances. However such joints are not easily dismantled for repacking with lubricant or for repair or replacement of damaged parts.

SUMMARY OF THE INVENTION

The present invention is a modification of the knuckle and swivel joint structures disclosed in co-pending application Ser. No. 286,470, now U.S. Pat. No. 4,386,869 permitting any one of the structures there disclosed to be disassembled for repacking with lubricant, or for replacement of damaged or worn parts.

The many objects and advantages of the present invention will become apparent to those skilled in the art when the following description of the best modes contemplated for practicing the invention is read in conjunction with the accompanying drawings, wherein like reference numerals refer to like or equivalent parts, and in which:

BRIEF DESCRIPTION OF THE DRAWING

FIG. 1 is a partial longitudinal sectional view through an example of a knuckle or swivel joint of the ball and socket type, according to the present invention;

FIG. 2 is an end view from line 2—2 of FIG. 1;

FIG. 3 is a cross-section along line 3—3 of FIG. 1;

DETAILED DESCRIPTION OF THE PREFERRED EMBODIMENTS

Figure 4:
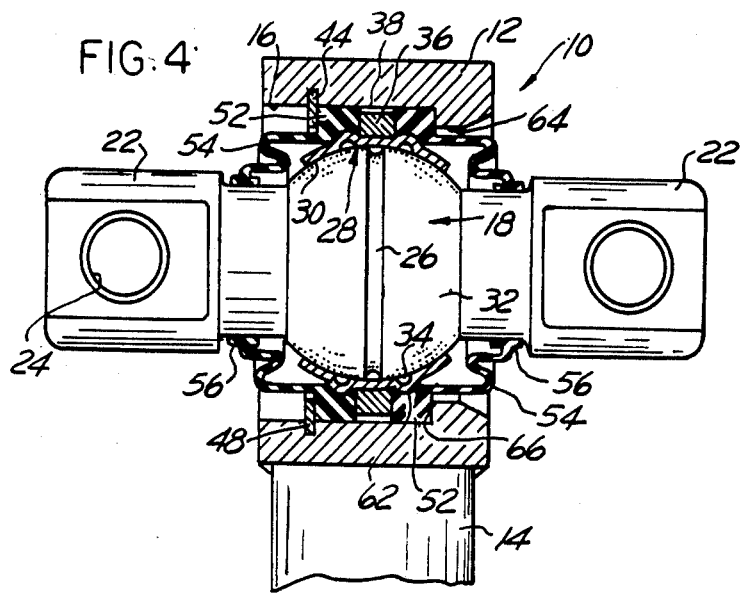
FIG. 4 is a view similar to FIG. 1 but showing a modification thereof.

Referring now to the drawing and more particularly to FIGS. 1-3, an example of structure for a double-stud knuckle or swivel joint 10 according to the present invention comprises a shell or housing 12 in the form of a tubular member to which is peripherally attached, such as by welding, a rod or tubing 14 supporting at its end, not shown, another similar swivel or knuckle joint or any other appropriate arrangement for attachment to a structure.

The housing 12 has a cylindrical bore 16 in which is disposed a ball member 18 provided, on diametrically opposed sides, with a pair of aligned studs 20 and 22. Each stud 20 or 22, integrally formed such as by cold-heading with the ball member 18, has a diametrical bore 24 for mounting to another portion of a structure, not shown. The knuckle or swivel joint 10 is of the type as used, for example, on the end of a torque tube or drag link in heavy-duty truck or trailer suspension systems.

The ball member 18, which, preferably, is provided with an equatorial lubrication groove 26, is capable of swiveling relative to a split substantially thin bearing shell 28 having a bearing spherical surface 30 is swiveling engagement with the spherical surface 32 of the ball member 18. The spherical surface 30 of the bearing shell 28, is provided, preferably, with a pair of lubrication grooves 34 disposed symmetrically relative to the lubrication groove 26 in the spherical surface 32 of the ball member 18 in the non-pivoted position, or neutral position, of the swivel or knuckle joint 10, as shown at FIG. 1, namely with the axis of the rod or tubing 14 substantially at right angle to the axis of the studs 20 and 22.

A solid or split metallic ring 36 is disposed between the internal bore 16 of the housing 12 and the periphery of the bearing shell 28. The outside diameter of the ring 36 is slightly less than the diameter of the bore 16 in the housing 12 such as to provide a narrow clearance space 38 between the peripheral surface of the ring 36 and the surface of the bore 16 in the shell 12. As best shown at FIG. 3, both the bearing shell 28 and the ring 36 may be provided with a slit, respectively shown at 40 and 42, for permitting the bearing shell 28 and the ring 36 to elastically enlarge when slipped over the ball member 18 prior to inserting into the bore 16 of the housing 12, in the course of assembly of the joint 10, although the ring 36 may be solid.

The sub-assembly consisting of the ball member 18 provided with its integral projecting studs 20 and 22, with the bearing shell 28 disposed around the ball member 18 and the ring 36 disposed around the bearing shell 28, is held elastically within the bore 16 of the housing 12 by way of a pair of removable resilient spring split rings 44 and 46, or snap ring retainers, the snap ring retainer 44 being disposed in a groove 48 and the snap ring retainer 46 being disposed in a groove 50, the grooves 48 and 50 being cut in the surface of the bore 16 of the housing 12. The flange 52 of a bellows seal 54 defines a resiliently deformable ring which is held in compression between the snap ring retainer 44 and a lateral surface of the ring 36, the bellows seal 54 having an elastic garter flange 56 compressibly surrounding a portion 58 of the stud 20 at the junction between the stud and the ball member 18. The snap ring retainer 46, in a similar manner, compressibly holds the flange 52 of a second bellows seal 54, defining a second resiliently deformable ring placed between the span ring retainer 46 and the other lateral surface of the ring 36. The bellows seal 54 has a garter end flange 56 elastically and compressibly surrounding a portion 60 between the stud 22 and the ball member 18.

The bellows seals 54 are made of any appropriate elastomeric material, and their end flange 52 acts as a resiliently deformable compression ring which compressibly molds itself around each of the annular ridges 62 formed on the peripheral surface of the thin bearing shell 28, when the lubrication grooves 34 are formed during stamping of the bearing shell 28. The elastically compressed annular flanges 52 of the bellows seals 54 thus elastically hold the split bearing shell 28 and the ring 36 substantially centered between the snap ring retainers 44 and 46. Small shocks and vibration are elastically absorbed by the compression rings defined by the bellows seal annular flanges 52, and more important loads tending to laterally displace the axis of the studs 20 and 22 are absorbed through the mass of the solid metallic ring 36 when the peripheral surface of the ring 36 is forced to engage the surface of the internal bore 16 of the housing 12, after a portion of the load force has been absorbed elastically, in a radial direction, by the compression rings defined by the annular flanges 52 of the bellows seals 54.

Preferably, the whole internal space circumscribed by the interior of the bellows seals 54 is packed with a lubricant, such as grease, during assembly of the knuckle or swivel joint 10. When it is desired to renew the lubricant, or when it is desired to replace a damaged bellows seal 54, a worn bearing shell 28, or a damaged ring 36, the knuckle or swivel joint 10 may be disassembled simply by removing one of the spring snap ring retainers 44 or 46, or both, by elastically compressing the snap ring retainer, as well known in the art, such as to disengage its peripheral portion from the corresponding one of the grooves 48 and 50.

The structure of FIG. 4 is identical to the presently described structure, except that one of the snap ring retainers is omitted, and the internal bore 16 of the housing 12 is provided with, proximate one end thereof, a reduced diameter portion 64 forming an annular surface 66 defining a lateral abutment for the compressed annular flange 52 of one of the bellows seals 54 during assembly of the knuckle or swivel joint 10, the diverse elements being held in assembly by means of a single spring snap ring retainer, such as the snap ring retainer 44, elastically engaged in the groove 48 in the surface of the bore 16 of the housing 12.

Figure 5:
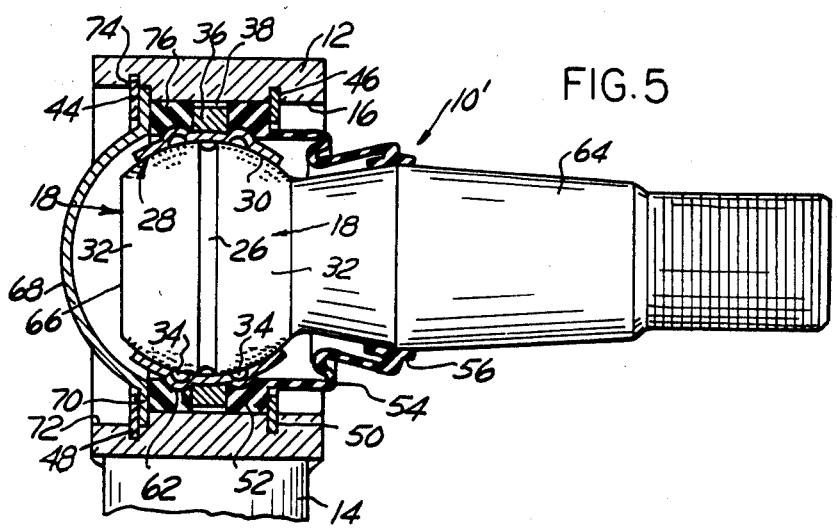
FIG. 5 is a view similar to FIG. 1 but showing a single stud ball and socket joint according to the invention.

At FIG. 5, there is illustrated an example of structure, according to the present invention, in the form of a knuckle or swivel joint 10' having a single stud 64 integrally formed on one side of the ball member 18. The other side of the ball member 18 is provided with a flat surface 66 and the corresponding end of the bore 16 in the housing 12 is hermetically sealed by a dome-like closure cap 68. The dome-like closure cap 68 has an integral annular flange 70 fitting an enlarged portion 72 of the bore 16, an annular radial step 74 being formed at the junction between the bore 16 and the enlarged diameter portion 72 of the bore 16. The annular radial step 74 provides an abutment surface for the annular flange 70 of the closure cap 68, and the diverse elements are held in assembly, in a similar manner as previously disclosed, by means of a pair of snap ring retainers 44 and 46, the snap ring retainer 44 being of a slightly overall larger diameter than the snap ring retainer 46, elastically extended at their periphery within the retaining groove 48 formed in the surface of the enlarged portion 72 of the bore 16 at the end closed by the end cap 68, and in the groove 50 at the other end of the bore 16 from which project the stud 64. A bellows seal 54 is disposed with its garter flange 56 elastically retained around the stud 64 and its annular flange 52, acting as a compression ring, retained between the snap ring retainer 46 and a lateral surface of the ring 36. A compression ring 76, made of appropriate elastomeric material, is disposed between the other lateral surface of the ring 36 and the flange 70 of the closure cap 68. As in the structures of FIGS. 1–4, the respective dimensions of the elements, and the longitudinal distance between the grooves 48 and 50 in the bore 16 of the housing 12, are such that the elastomeric compression rings are held in lateral and radial compression.

It will be appreciated by those skilled in the art that the interior of the knuckle or swivel joint assembly 10' is hermetically sealed from the ambient by the bellows seal 54 on one end and the closure cap 68 on the other end and all the interior surface spaces and bearing surfaces of the joint may be packed with an appropriate lubricant, such as grease. When it is desired to repack the joint with lubricant, or if it is desired to replace some worn-out or damaged part, the joint may be disassembled by removing one or both of the snap ring retainers 44 and 46.

Figure 6:
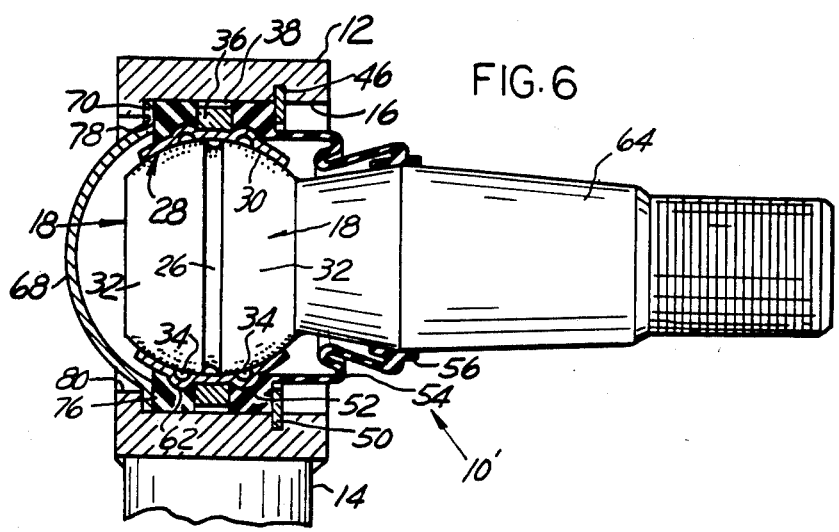
FIG. 6 is a modification of the structure of FIG. 5.

The structure of the knuckle or swivel joint 10' of FIG. 6 is identical to that of FIG. 5, except that a single snap ring retainer is used, such as the snap ring retainer 46 retaining in compression the annular flange 52 of the bellows seal 54. The closure cap 68 is retained in assembly in the bore 16 of the housing 12 by its peripheral annular flange 70 engaging an annular radial abutment surface 78 formed at the end of the bore 16 in the housing 12 between the bore 16 and a reduced diameter portion 80. The structure of FIG. 6 may be disassembled simply by removing the snap ring 46.

It will be appreciated by those skilled in the art that, in some structures of knuckle or swivel joints, the clearance 38 between the peripheral surface of the ring 36 and the surface of the bore 16 in the housing 12 may be very narrow, or even non-existent, with the result that the resiliently deformable rings, such as the flange 52 of the bellows seal 54 of FIGS. 1–6 and the resiliently compressed ring 76 of FIGS. 5 and 6, carry very little, if any, of the forces transmitted by the ball member 18 to the housing 12.

It will also be appreciated by those skilled in the art that although the examples of structure illustrated and described hereinbefore comprise the split bearing shell 28 and the split ring 36 arrangement which is one of the structures disclosed in U.S. Pat. No. 4,386,869 the principle of the present invention for providing a knuckle or swivel joint which may be disassembled for repacking with lubricant or for repair is adaptable to all the structures disclosed in said co-pending application, and in many other structures of knuckle and swivel joints of the ball and socket type.

Having thus described the present invention by way of examples of specific structures well adapted to accomplish the objects of the invention, modifications whereof will be apparent to those skilled in the art, what is claimed as new is as follows:

I claim:

1. In a sealed bearing comprising an inner member having a peripheral surface of regular predetermined contour, a tubular housing, a solid ring disposed in said housing, a bearing shell having a bearing surface in sliding engagement with the peripheral surface of said inner member, said solid ring having a peripheral surface generally conforming to the inner surface of said housing and fitting in said housing, a pair of resiliently deformable rings each made of elastomeric material and each disposed on one side of said solid ring, means in said housing holding said deformable rings under compression such as to firmly engage said deformable rings with a portion of said solid ring towards the peripheral surface of said inner member, an elastomeric bellows seal at one end of said housing and having a flange at an end held by one of said means in said housing for holding one of said deformable rings under compression, said bellows seal having a garter flange at an other end in firm elastic engagement with a portion of the peripheral surface of said inner member, and sealing means at the other end of said housing sealing the interior of said housing and said bearing surfaces from the ambient, wherein said inner member has a portion projecting from said housing at an end of said housing, the improvement comprising a groove in the inner surface of said housing, one of said holding means being in the form of a springingly expandable removable retaining ring disposed in said groove, said bellows seal having said flange at an end formed integral with a corresponding one of said resiliently deformable rings and said garter flange at said outer end in firm elastic engagement with the peripheral surface of said portion of said inner member projecting from said housing, whereby said bellows seal defines a first sealing means at one end of said housing sealing the interior of said housing and said bearing surfaces from the ambient and held by said one of said holding means, an outwardly domed end cap closing the other end of said housing, said outwardly domed end cap having an outwardly extending edge flange engaged with the other of said resiliently deformable rings being held by the other of said holding means.

2. The improvement of claim 1 further comprising a retaining flange formed integral with said tubular housing and defining the other of said holding means.

3. The improvement of claim 1 further comprising a second groove in the inner surface of said tubular housing and a second springingly expandable removable retaining ring disposed in said second groove defining the other of said holding means.

* * * * *